US012659369B2

(12) United States Patent
Nguyen et al.

(10) Patent No.: US 12,659,369 B2
(45) Date of Patent: Jun. 16, 2026

(54) DATA OFF-LOAD IN NETWORK DEVICES WITH CONSTRAINED STORAGE TO PERFORM A TASK

(71) Applicant: Cisco Technology, Inc., San Jose, CA (US)

(72) Inventors: Dinh Cat Ngoc Nguyen, San Jose, CA (US); David John Zacks, Vancouver (CA); Nandini Maheshwari, San Jose, CA (US); Craig D. Wickham, Langley (CA); Leila Reyhani, Toronto (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 28 days.

(21) Appl. No.: 18/525,097

(22) Filed: Nov. 30, 2023

(65) Prior Publication Data

US 2025/0184389 A1    Jun. 5, 2025

(51) Int. Cl.
| | |
|---|---|
| *H04L 67/1012* | (2022.01) |
| *H04L 9/40* | (2022.01) |
| *H04L 67/1008* | (2022.01) |

(52) U.S. Cl.
CPC .......... *H04L 67/1008* (2013.01); *H04L 63/20* (2013.01); *H04L 67/1012* (2013.01)

(58) Field of Classification Search
CPC . H04L 67/1008; H04L 67/1012; H04L 63/20; H04L 41/02; H04L 41/08; H04L 41/12
USPC ........................................................ 709/226
See application file for complete search history.

(56) References Cited

U.S. PATENT DOCUMENTS

| | | | |
|---|---|---|---|
| 7,222,147 B1 | 5/2007 | Black et al. | |
| 10,360,150 B2 * | 7/2019 | Karthikesan | ........ G06F 12/0284 |
| 10,938,660 B1 * | 3/2021 | Kapur | .................... H04L 41/22 |
| 2012/0289147 A1 | 11/2012 | Raleigh et al. | |
| 2019/0042221 A1 | 2/2019 | Krishnaiyer et al. | |
| 2019/0327180 A1 | 10/2019 | Todd et al. | |
| 2020/0076875 A1 * | 3/2020 | Sabella | ............. H04W 28/0205 |
| 2020/0142735 A1 * | 5/2020 | Maciocco | ............. H04L 9/0825 |

OTHER PUBLICATIONS

Microsoft Azure: "Azure IoT Hub", retrieved from https://azure.microsoft.com/en-us/products/iot-hub, Nov. 6, 2023, 8 Pages.
Nwafor E., et al., "Dynamic Load Sharing in Memory Constrained Devices: A Survey", 2021 IEEE 7th World Forum on Internet of Things, Jun. 14-Jul. 31, 2021, 6 pages.

* cited by examiner

*Primary Examiner* — Glenford J Madamba
(74) *Attorney, Agent, or Firm* — Edell, Shapiro & Finnan, LLC

(57) ABSTRACT

In one example embodiment, a first network device is determined to have insufficient storage to perform a task. A second network device is identified with available storage, and data is transferred from the first network device to the second network device to provide sufficient storage for the task on the first network device. The task is performed on the first network device, and the data is restored to the first network device from the second network device after completion of the task.

20 Claims, 6 Drawing Sheets

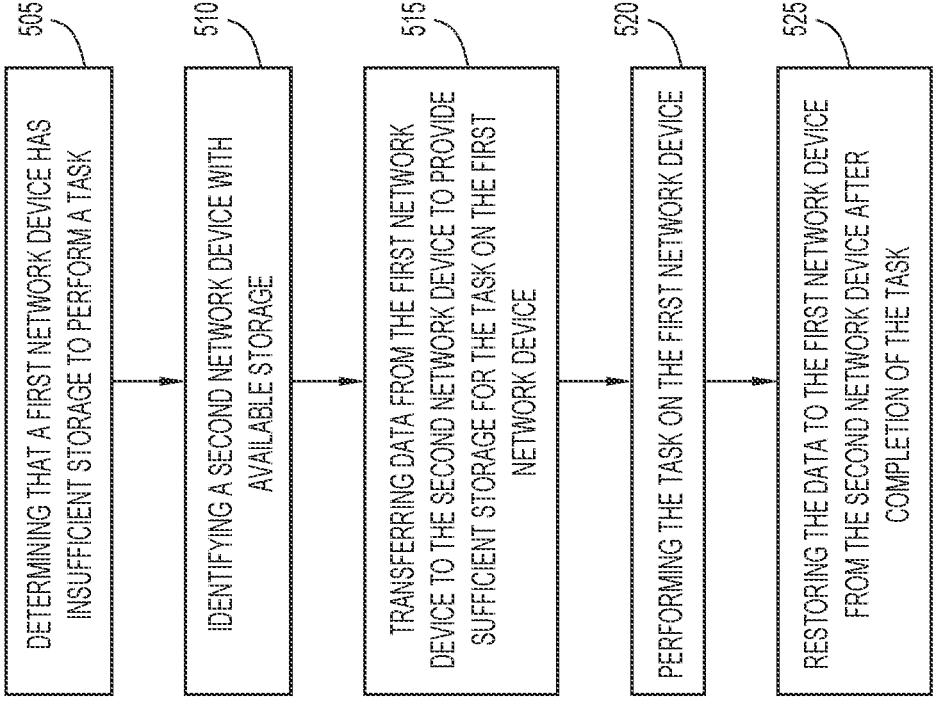

505 DETERMINING THAT A FIRST NETWORK DEVICE HAS INSUFFICIENT STORAGE TO PERFORM A TASK

510 IDENTIFYING A SECOND NETWORK DEVICE WITH AVAILABLE STORAGE

515 TRANSFERRING DATA FROM THE FIRST NETWORK DEVICE TO THE SECOND NETWORK DEVICE TO PROVIDE SUFFICIENT STORAGE FOR THE TASK ON THE FIRST NETWORK DEVICE

520 PERFORMING THE TASK ON THE FIRST NETWORK DEVICE

525 RESTORING THE DATA TO THE FIRST NETWORK DEVICE FROM THE SECOND NETWORK DEVICE AFTER COMPLETION OF THE TASK

DATA OFF-LOAD IN NETWORK DEVICES WITH CONSTRAINED STORAGE TO PERFORM A TASK

TECHNICAL FIELD

The present disclosure relates to data storage among network devices.

BACKGROUND

Many devices have limited available local storage. These types of devices may include Internet of Things (IoT) devices with limited local storage, portable devices (e.g., phones and tablets) whose local storage may be mostly consumed, and networking devices where local storage space may be used for various auxiliary functions (and, therefore, is at a premium).

When these devices perform an upgrade, the devices may lack the required available storage space to perform the upgrade. As a result, the operator of a device has to manually create the storage space before proceeding with the upgrade. This is a tedious and, oftentimes, difficult process due to multiple factors, including: the inability to clear up existing storage, the lack of a mechanism to transport data from existing storage out of the current device, and the complicated process associated with selection of data to move off-board and data to retain.

BRIEF DESCRIPTION OF THE DRAWINGS

FIG. 5 is a flowchart of a generalized method for data storage among network devices, according to an example embodiment.

DETAILED DESCRIPTION

Overview

Figure 1:
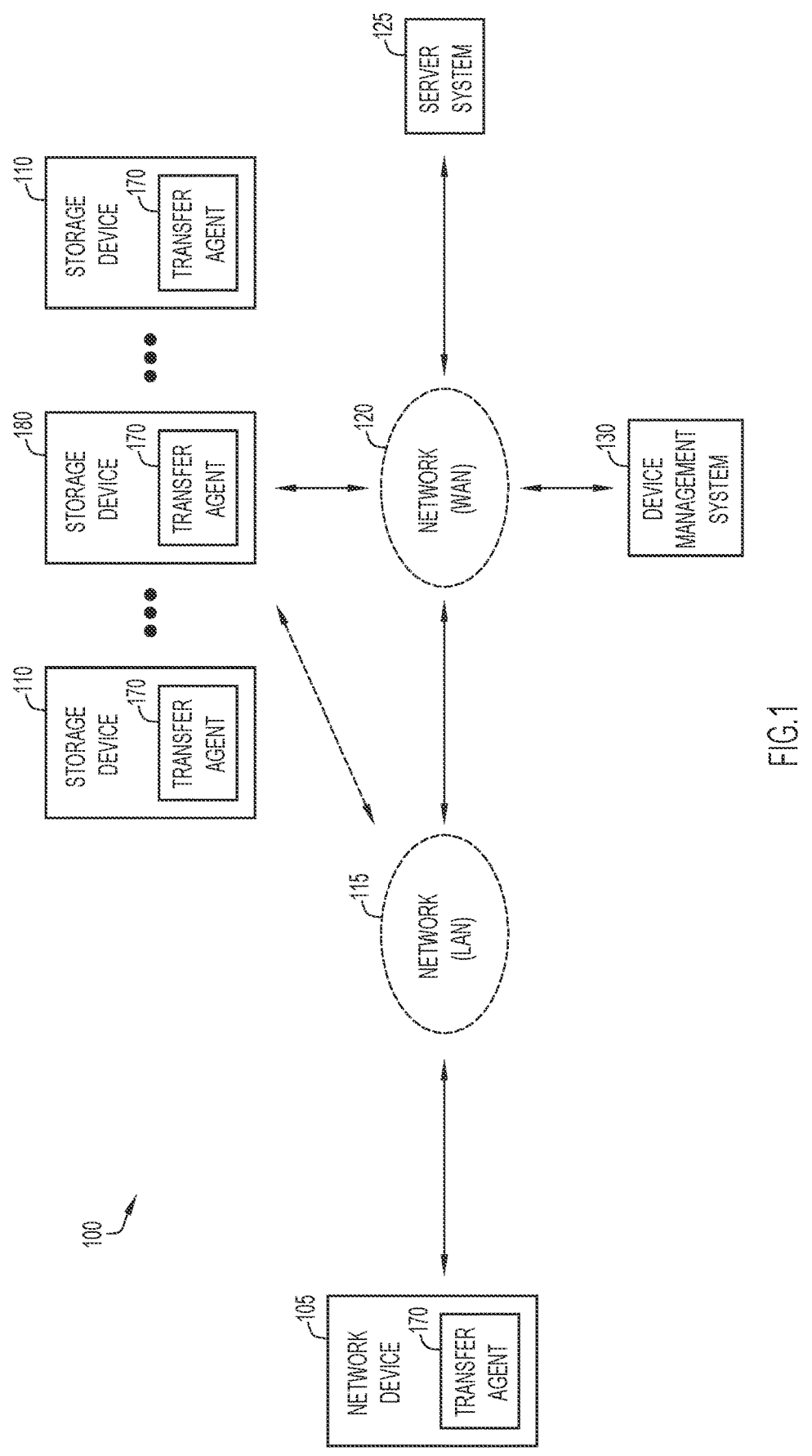
FIG. 1 is a block diagram of an example network environment for a centralized approach for data storage among network devices, according to an example embodiment.

In one example embodiment, a first network device is determined to have insufficient storage to perform a task. A second network device is identified with available storage, and data is transferred from the first network device to the second network device to provide sufficient storage for the task on the first network device. The task is performed on the first network device, and the data is restored to the first network device from the second network device after completion of the task.

Example Embodiments

Modern devices are constantly evolving systems that require changes and receive multiple upgrades during their lifespan. However, storage is often constrained on these devices, thereby making it challenging for upgrades to be processed as the device may lack the storage space to hold both old and new code during the process of upgrading.

Many storage options exist, however, these options may involve an operator to establish connections and transfer data, initiate an upgrade, and restore the data. This is extremely time-consuming and error prone, and may be so cumbersome that operators defer an upgrade rather than undertake the laborious manual procedure.

For example, blockchain systems exist which provide a decentralized method of data storage. However, blockchain systems are manually configured, and data movement to and from the blockchain is not automated to preserve local storage space on a device.

Cloud-based storage systems provide a temporary storage area that may be used by devices, and offer a user limited abilities to preserve local storage on the device by extending larger files (e.g., full resolution photos) out to the cloud. However, these systems operate on a per-device basis only (i.e., only for phones or tablets) and for specific (and usually very limited) file types (e.g., photos). No general purpose mechanism is provided for temporary storage off-load and recovery for any and all file types, nor do these systems provide any discovery mechanism for network-adjacent available storage.

An embodiment of the present disclosure serves to automate the process of upgrading (or performing other tasks on) a device with insufficient local storage at the time of the upgrade. The embodiment enables fast and critical upgrades (or other tasks) to be performed without an operator having to manually handle storage space allocation for a device. This saves time, money, and effort with respect to the storage space allocation. The embodiment completely automates the storage space allocation for the device by providing automated discovery of adjacent network elements that possess adequate free (or available) storage space, and automated movement of data elements between the device and the network elements in a secure and reliable manner.

An embodiment of the present disclosure is beneficial for air-gapped systems (e.g., systems without a connection to unsecured systems and/or networks). Many Internet of Things (IoT) environments and other sensitive network systems choose to be, or are configured to be, air-gapped from the broader network/internet. Thus, cloud-based solutions are not available in these instances, thereby forcing network and system operators in these environments to utilize manual, inefficient, and time-consuming techniques for enabling upgrades (or other tasks) on storage constrained devices.

An embodiment of the present disclosure provides a dynamic, secure, and completely automated way to enable upgrades (or other storage space consuming functions or tasks) without impact to the devices involved, and in a way that is completely seamless to both network and device operators.

An embodiment of the present disclosure enables fast and critical upgrades (or other tasks) to be performed without an operator having to handle storage space allocation. Devices in need of storage can dynamically and temporarily transfer data to a peer storage device with available storage space, subsequently perform an upgrade (or other task), and restore their data. The technique involves no administrator input, can be fully automated, and takes into account security parameters for authentication, data transfer, and data storage. The embodiment allows devices (e.g., routers, switches, firewalls, cameras, Internet Of Things (IoT) devices, client devices, etc.) to dynamically free-up storage space and perform a task (e.g., software or firmware modification (e.g., update, upgrade, or otherwise change software or firmware, configuration modification, etc.), etc.). This allows the life of devices to be extended while still performing necessary tasks.

An embodiment relies on different devices communicating with each other for dynamically, temporarily, and securely off-loading local data to perform a task and subsequently restoring the data. The embodiment provides full automation and incorporates necessary security requirements.

In an embodiment, a source device looks for resources inside a network that are advertising secure available storage for temporary use. Further, the source device requiring temporary storage may also solicit available storage from the network by sending out request queries. When an upgrade (or other task) is to be performed and a target device exists on the network with available storage, the source device automatically uses this additional storage to facilitate performance of the upgrade (or other task). After the upgrade (or other task) is completed, data is transferred back to the source device. This is performed in a completely secure, transparent, and simple fashion.

In an embodiment, data from a network device targeting an upgrade (or other task) is moved to temporary storage provided by another network device. The network device targeting the upgrade streams the data from its local filesystem, and has it stored on the other network device. This data can be compressed before or after the transfer (or not at all). After the upgrade (or other task) is completed, the data is requested and transferred back to the original network device. The embodiment may be used with simple devices, such as in the Internet of Things (IoT) space. In some cases, storage space may be needed to unpack the upgrade prior to installation (e.g., for network devices, such as routers and switches). The embodiment enables the network device to temporarily and dynamically free-up storage space to unpack and proceed with the upgrade. After the upgrade (or other task) is completed, the unneeded files for the upgrade (or other task) can be removed and the previous data restored. The embodiment may also be used on more complex consumer grade devices, such as mobile phones and tablets.

An embodiment may provide a one-to-one mapping between a network device and another network device providing a temporary data store. In addition, an embodiment may provide a many-to-one mapping between the network device and multiple other network devices providing the temporary data store (e.g., one network device may store data to multiple network devices collectively providing requested data storage).

While the present embodiments are described with respect to network devices performing upgrades, it will be appreciated that the present embodiments may be applied to various devices and networks (or network arrangements) for off-loading and restoring data to perform any desired tasks (e.g., firmware/software modification (e.g., upgrades, updates, or other changes, etc.), hardware modification (e.g., upgrades, updates, or other changes, etc.), etc.) in substantially the same manner described below. Although the present embodiments are preferably utilized with persistent type storage (e.g., as opposed to working type or volatile memory, such as RAM, etc.), the present embodiments may be utilized with respect to any type of storage (e.g., persistent storage, working or other memory, volatile or non-volatile memory, any types of devices capable of storing data, etc.).

In addition, present embodiments may utilize various network storage devices (e.g., shared drive, network-attached storage (NAS), etc.) in substantially the same manner described below. Using a shared drive or network-attached storage (NAS) on their own involves an operator to manually select data to transfer, perform the transfer, and subsequently relocate the moved files back to their original location. However, present embodiments perform storage discovery, data off-load and recovery, and capabilities exchange in an automated and secure fashion. The efficiency derives from the automated and secure nature of the data transfer protocol employed by the present embodiments. With the devices on the network providing the specifications themselves (e.g., security level, etc.), present embodiments are less prone to human error.

In an embodiment, a centralized approach may be utilized that employs a centralized trusted device (in communication with the devices employing the data transfer). The centralized trusted device may include any network device with storage, such as a router (e.g., potentially acting as a default gateway for a network segment), a centralized server (e.g., on premises or cloud based), or other trusted resources as enabled by an enterprise. Available storage space and security level are communicated by the centralized trusted device to any potential users upon connection. This may be accomplished using a link level broadcast or multicast, communicated via a central authority (e.g., Domain Name System (DNS), Dynamic Host Configuration Protocol (DHCP), etc.), and/or looked-up in an enterprise service catalogue.

Since a requesting device may be presented with multiple possible temporary storage options, the requesting device determines a best option. This determination may be based on available storage space, performance, trust levels, security, redundancy, error checking, data integrity, and/or any other appropriate factors. The centralized approach is typically suitable for controlled environments, corporate use, and larger deployments.

FIG. 1 illustrates a block diagram of an example network environment 100 for a centralized approach for data storage among network devices in which an embodiment presented herein may be implemented. The network environment includes a network device 105, one or more storage devices 110, networks 115, 120, a server system 125, and a device management system 130. Network 115 may include a local area network (LAN), while network 120 may include a wide area network (WAN). Network device 105 is coupled to network 115, while storage devices 110, server system 125, and device management system 130 may be coupled to network 115 and/or network 120. Network 115 is coupled to network 120 to enable network devices of network 115 (e.g., network device 105, etc.) to communicate with remote network devices of network 120 (e.g., storage devices 110, server system 125, device management system 130, etc.). Server system 125 maintains location information for various storage devices 110. In the centralized approach, storage devices 110 are centralized storage devices designated to store data for network devices (as opposed to storage by peer network devices in a decentralized approach described below). Storage devices 110 may include any network device with storage (e.g., a router (e.g., potentially acting as a default gateway for a network segment), a centralized server (e.g., on premises or cloud based), etc.). By way of example, storage devices 110 may include storage server systems. Device management system 130 may provide various modifications for network devices (e.g., code (software and/or firmware) updates, upgrades, or other changes; configuration updates, upgrades, or other changes; patches; etc.). Network device 105, storage devices 110, server system 125, and device management system 130 may be implemented by, or include, any conventional or other network elements (e.g., routers, gateways, servers, nodes, switches, hubs, user devices, etc.).

Network device 105 may desire to perform a task (e.g., update, upgrade, or otherwise change code (software or firmware); update, upgrade, or otherwise change device configuration; install patches, etc.). By way of example, the task may include a code (software or firmware) update or upgrade. Update information may be provided by device management system 130, where performance of the code update requires an amount of storage space on network device 105. In this case, network device 105 analyzes the update information and amount of available storage space and determines that the amount of storage space required by performance of the code update exceeds the amount of storage space available on network device 105.

Accordingly, network device 105 performs storage discovery to identify one or more storage devices to off-load sufficient amounts of data in order to provide available storage space to perform the code update. Network device 105 sends a request for storage over networks 115 and/or 120 to server system 125 that maintains location information for various storage devices 110. The request may include information indicating a desired storage device (e.g., a Domain Name System (DNS) name, etc.). The server system maintains location information for various storage devices 110, and identifies location information of one or more storage devices satisfying the request. Server system 125 sends a response over networks 115 and/or 120 to network device 105 including a location (or address) of one or more storage devices 110. By way of example, server system 125 may include a Domain Name System (DNS), Dynamic Host Configuration Protocol (DHCP), or other server that may identify the location (or address) of one or more storage devices for network device 105.

By way of example, network device 105 may identify a storage device 180 (from among storage devices 110) based on the response. The centralized approach enables network device 105 to utilize local or remote storage devices. For example, storage device 180 may be local to network device 105 and be coupled to network 115, or may be remote from network device 105 and be coupled to network 120. Network device 105 establishes a connection with storage device 180 in order to transfer data. This may include authentication of storage device 180, validation of the storage device with respect to security, and exchange of security parameters (e.g., keys, etc.).

Network device 105 determines data that can be removed from that network device and stored on storage device 180 in order to provide sufficient storage space for the code update. Network device 105 includes knowledge of data that may be moved to temporarily free-up storage. For example, a router or switch may temporarily move previous compressed binary (BIN) files allowing enough storage memory space to unpack and process a code update. The data to remove or off-load may be determined based on various criteria (e.g., priorities, essential data, user preferences, certain types of files, etc.).

The determined data is sent from network device 105 over networks 115 and/or 120 to storage device 180 for storage. The data is processed according to a desired security policy for transmission and storage. Once the data is sent, network device 105 performs the code update (from device management system 130) based on the update information. After completion of the code update, network device 105 retrieves the data from storage device 180. Thus, network device 105 temporarily stores a sufficient amount of data on storage device 180 to perform the code update, and subsequently restores the data in response to completion of the code update. Network device 105 may identify and store data on a plurality of storage devices 110 in substantially the same manner described above. Networks 115, 120 may employ any conventional or other protocols, standards, security measures, and/or error correction to transfer data.

Network device 105 and storage devices 110 include a transfer agent 170 to perform operations for transferring and restoring the data. Transfer agent 170 may include an agent on network device 105 and storage devices 110, or an operating system (OS) level extension to enable the functionality. In other words, transfer agent 170 may include an agent running in the OS of a corresponding device (e.g., in a container, etc.), or be built directly into the operating system of the corresponding device. The transfer agent dynamically and securely locates available storage and performs transfer and restore of data for a network device without operator involvement as described herein.

Figure 2:
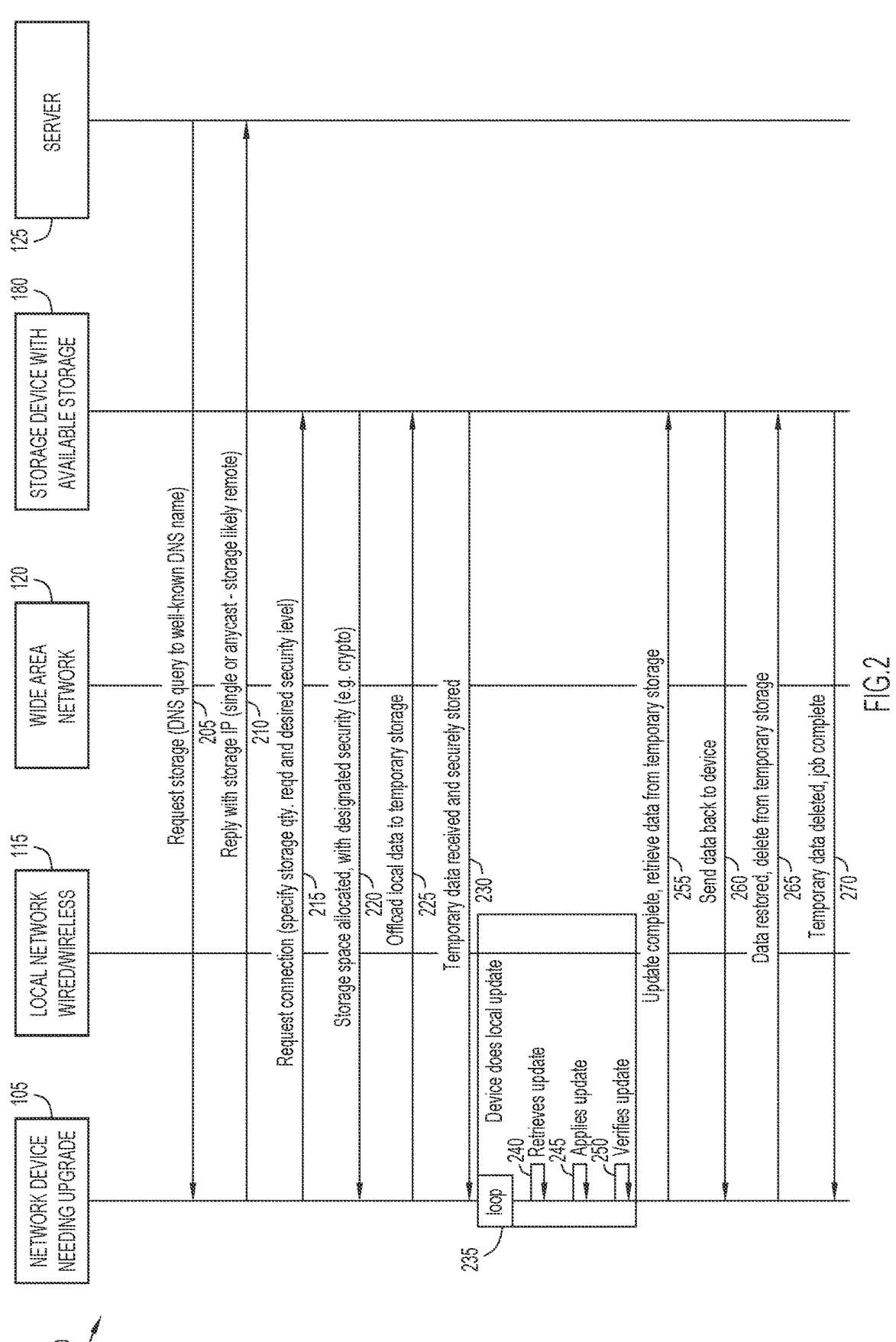
FIG. 2 is a flow diagram of a method for data storage among network devices for a centralized environment, according to an example embodiment.

With continued reference to FIG. 1, FIG. 2 illustrates a flow diagram of a method 200 for data storage among network devices for a centralized environment, according to an example embodiment. Initially, network device 105 may desire to perform a task (e.g., update, upgrade, or otherwise change code (software or firmware); update, upgrade, or otherwise change device configuration; install patches, etc.). By way of example, the task may include a code (software or firmware) update or upgrade. Update information may be provided by device management system 130, where performance of the code update requires an amount of storage space on network device 105. In this case, network device 105 analyzes the update information and amount of available storage space and determines that the amount of storage space required by performance of the code update exceeds the amount of storage space available on network device 105.

Accordingly, network device 105 performs storage discovery to identify one or more storage devices to off-load sufficient amounts of data in order to provide available storage space to perform the code update. In the centralized approach, storage devices 110 are centralized storage devices designated to store data for network devices (as opposed to storage by peer network devices in a decentralized approach described below). Present embodiments may employ any conventional or other techniques to identify one or more storage devices (e.g., Domain Name System (DNS), Dynamic Host Configuration Protocol (DHCP), hard-coded, etc.). For example, a storage device may be hard-coded (e.g., DNS name, etc.) into a network device 105. In this case, the storage device is predetermined for the network device.

By way of example, network device 105 may send a request for storage space over networks 115 and/or 120 to server system 125 at operation 205. For example, the request may include a Domain Name System (DNS) query for a known or predetermined DNS name (e.g., of storage device 180). Server system 125 maintains location information for the various centralized storage devices 110, and identifies location information of a storage device satisfying the request. In an embodiment, server system 125 may include a DNS server system that perform a DNS look-up for the predetermined name (e.g., storage.xyz.com, etc.) to return a location (e.g., IP or other address) of a corresponding storage device. This may be used for a dedicated corporate managed storage device. The location returned from the DNS look-up may leverage an anycast address (e.g., a same address shared by devices in multiple locations, where routing identifies a closest device). This provides a simplified manner to locate a topologically closest storage device when multiple storage devices exist across the environment.

In an embodiment, server system 125 may include a Dynamic Host Configuration Protocol (DHCP) server system and return one or more DHCP options to network device 105 to provide information on IP addresses or DNS names where a network device in that scope may access storage services. Network device 105 obtains this information from the associated DHCP options, and uses the information to locate a storage device.

In an embodiment, server system 125 may select from among a plurality of storage devices based on various techniques. For example, server system 125 may employ a round-robin approach where location information for a different/next storage device is selected for each request. Further, server system 125 may provide location information for a plurality of storage devices.

Server system 125 sends a reply over networks 115 and/or 120 to network device 105 at operation 210. The reply includes an indication (e.g., a single or anycast address, DHCP options, etc.) of one or more storage devices. In the event that multiple storage devices are available to network device 105 for storage, network device 105 may select a network device for storage based on various techniques (e.g., round robin technique alternating between network devices for each update, a best match based on available resources and/or other device characteristics, a lowest response time, etc.).

By way of example, network device 105 may identify a storage device 180 (from among storage devices 110) based on the response. The centralized approach enables network device 105 to utilize local or remote storage devices. For example, storage device 180 may be local to network device 105 and be coupled to network 115, or may be remote from network device 105 and be coupled to network 120.

Network device 105 sends a connection request to storage device 180 at operation 215. The connection request may specify the amount of storage and any required or desired level of security (e.g., encryption, etc.). Network device 105 may analyze the update information and amount of available storage space to determine a sufficient amount of storage for data to off-load. Storage device 180 processes the request and returns a message at operation 220 indicating allocation of the requested storage space and a designated security level (e.g., encryption, etc.). Operations 215 and 220 basically enable the network device and storage device to perform a negotiation for authentication and security for data and devices and verify compliance of security policies between the network device and storage device. By way of example, network device 105 may authenticate storage device 180 as a trusted device based on a certificate, and may verify storage device 180 has sufficient available storage space to store the requested amount of data from network device 105. Further, parameters for secure transmission of data (e.g., personally identifiable information (PII) or other sensitive data, etc.) from network device 105 and for secure storage of data at storage device 180 may be exchanged (e.g., encryption or other keys, etc.).

In addition, security policies of network device 105 and storage device 180 may be compared to determine that storage device 180 can store the data at a comparable level of security desired or required by network device 105 (e.g., a desired level of security for PII or other sensitive data, etc.). When storage device 180 cannot be validated or provide an adequate level of security, network device 105 ends the session and does not use storage device 180 to store data. In this case, network device 105 may identify and/or request connection with another storage device in substantially the same manner described above. In other words, network device 105 may select a storage device (from among a plurality of storage devices) based on satisfaction of authentication, storage, and/or security requirements.

An embodiment may select and authenticate a remote storage device in various manners. For example, an embodiment may utilize centralized storage servers. These devices may be corporately managed and specifically designed to dynamically and securely support data off-load and restore. In a case where there are multiple types of dynamic storage available, an indicator is used to determine which storage is best. By way of example, a server that is dedicated and supports all levels of security may be higher rated for remote storage than a switch with limited storage and certain levels of security. Priority may also be used between like devices (e.g., one server may be a primary and a second server may be designated as back-up only, etc.). Embodiments may support various forms of encryption and authentication, however, a number of these parameters are configurable and dependent on the deployment. If a user leveraged certificates for network access and segmentation for their specific devices, a pre-shared key may be used between network and storage devices. In other cases, certificates may be leveraged for authentication between network and storage devices.

In an embodiment, security may be omitted in cases of low or no security requirements. For example, the data to be off-loaded and stored may not be sensitive or require security.

Depending on the level of security, various identifiers may be used for the data in order to associate a network device with its temporarily stored data. For example, the identifiers may include certificates, or a combination of attributes (e.g., MAC address, host name, etc.) to establish a unique identifier. This may be device/implementation dependent and configurable based on the deployment.

Network device 105 determines data that can be removed from that network device and stored on storage device 180 in order to provide sufficient storage space for the code update. Network device 105 includes knowledge of data that may be moved to temporarily free-up storage. For example, a router or switch may temporarily move previous compressed binary (BIN) files allowing enough storage memory space to unpack and process a code update. The data may be determined based on various criteria (e.g., priorities, essential data, user preferences, types of files, etc.).

The determined data is sent from network device 105 over networks 115 and/or 120 to storage device 180 for storage at operation 225. The data is processed according to a desired security policy for transmission and storage. Storage device 180 stores the data (based on the identifier associated with network device 105), and sends a message to network device 105 at operation 230 indicating that the data has been received and securely stored.

Once the data is sent, network device 105 performs the code update from device management system 130 at operation 235. This includes retrieving the code update information at operation 240, applying the update at operation 245, and verifying the update at operation 250. The code update may be accomplished via any conventional or other techniques.

After completion of the code update, network device 105 notifies storage device 180 of completion of the code update, and requests retrieval of the data from storage device 180 at operation 255. Storage device 180 retrieves the data (based on the identifier associated with the network device 105), and sends the data to network device 105 at operation 260. Network device 105 restores the data on that network device, and notifies storage device 180 of the restoration of the data. Further, network device 105 sends a request to storage device 180 to delete the data temporarily stored on storage device 180 at operation 265.

Storage device 180 deletes the data and informs network device 105 of the deletion and job completion at operation 270. Thus, network device 105 temporarily stores a sufficient amount of data on storage device 180 to perform the code update, and subsequently restores the data in response to completion of the code update.

In an embodiment, a decentralized approach may be employed that is based on participating target network devices being able to broadcast or multicast their available resources at a corresponding security level, and source or client network devices (e.g., off-loading data, etc.) being able to broadcast or multicast their resources. The decentralized approach may be more applicable to smaller deployments, such as homes, etc.

In the decentralized approach, storage discovery (e.g., discovery of servers or devices that may be offering temporary storage) may be accomplished in various manners (e.g., broadcast, link-local multicast, traditional multicast, etc.). With respect to broadcast or link-local multicast, service discovery may be limited to a local subnet. This has an advantage of being extremely simple and involving little to no pre-knowledge by a source network device.

Traditional multicast for a service announcement typically leverages a pre-known multicast group that both a source network device and a server or other target network device (e.g., storing data) join, or a pre-configured multicast group the client or source network device may access through an enterprise service catalogue. This enables reachability beyond the confines of local LAN segments.

Figure 3:
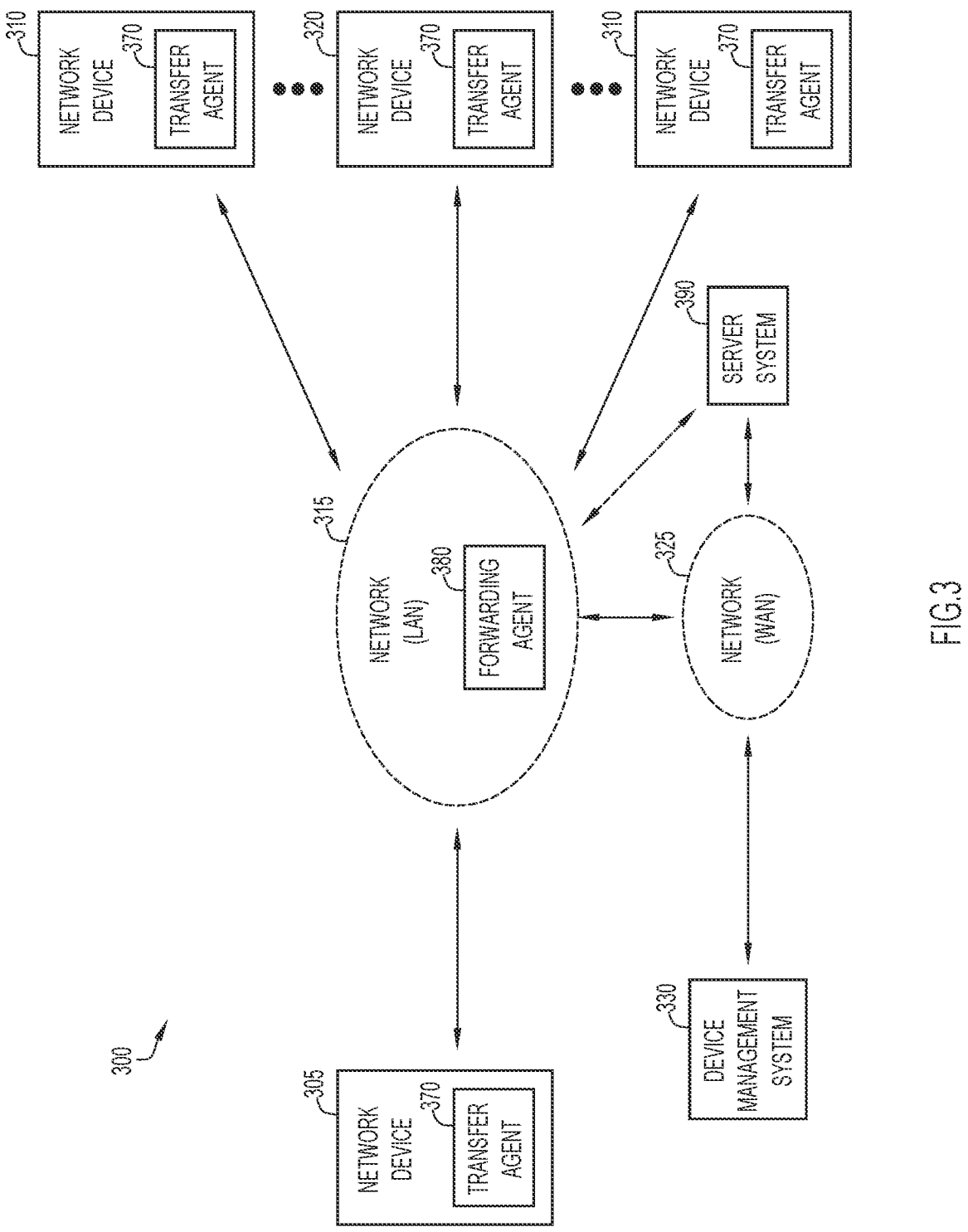
FIG. 3 is a block diagram of an example network environment for a decentralized approach for data storage among network devices, according to an example embodiment.

FIG. 3 illustrates a block diagram of an example network environment 300 for a decentralized approach for data storage among network devices in which an embodiment presented herein may be implemented. Network environment 300 includes a source or client network device 305, one or more target network devices 310, networks 315, 325, and device management system 330. Network 315 may include a local area network (LAN), while network 325 may include a wide area network (WAN). Source network device 305 and target network devices 310 are coupled to network 315, while device management system 330 may be coupled to network 315 and/or network 325. Network 315 is coupled to network 325 to enable network devices of network 315 (e.g., network device 305, etc.) to communicate with remote network devices of network 325 (e.g., device management system 330, etc.). In the decentralized approach, network device 305 may store data on peer network devices 310 (as opposed to centralized storage devices in the centralized approach described above).

Device management system 330 may provide various modifications for network devices (e.g., code (software and/or firmware) updates, upgrades, or other changes; configuration updates, upgrades, or other changes; patches; etc.). Network device 305, target network devices 310, and device management system 330 may be implemented by, or include, any conventional or other network elements (e.g., routers, gateways, servers, nodes, switches, hubs, user devices, etc.).

Network device 305 may desire to perform a task (e.g., update, upgrade, or otherwise change code (software or firmware); update, upgrade, or otherwise change device configuration; install patches, etc.). By way of example, the task may include a code (software or firmware) update or upgrade. Update information may be provided by device management system 330, where performance of the code update requires an amount of storage space on network device 305. In this case, network device 305 analyzes the update information and amount of available storage space and determines that the amount of storage space required by performance of the code update exceeds the amount of storage space available on network device 305.

Accordingly, network device 305 performs storage discovery to identify one or more target network devices 310 to off-load sufficient amounts of data in order to provide available storage space to perform the code update. Network device 305 sends a request for storage space over network 315 to target network devices 310. Each target network device 310 determines whether that network device has sufficient available storage to satisfy the request. By way of example, one or more target network devices 310 determine that they have sufficient available storage to satisfy the request, and each sends a response over network 315 to network device 305 including a location (or address) or other identifier of that network device.

By way of example, network device 305 may identify a network device 320 (from among network devices 310) based on the responses. The decentralized approach enables network device 305 to utilize local network devices (or network 315) to off-load data. Network device 305 establishes a connection with network device 320 in order to transfer data. This may include authentication of network device 320, validation of network device 320 with respect to security, and exchange of security parameters (e.g., keys, etc.).

Network device 305 determines data that can be removed from that network device and stored on network device 320 in order to provide sufficient storage space for the code update. Network device 305 includes knowledge of data that may be moved to temporarily free-up storage. For example, a router or switch may temporarily move previous compressed binary (BIN) files allowing enough storage space to unpack and process a code update. The data may be determined based on various criteria (e.g., priorities, essential data, user preferences, types of files, etc.).

Determined data is sent from network device 305 over network 315 to network device 320 for storage. The data is processed according to a desired security policy for transmission and storage. Once the data is sent, network device 305 performs the code update (from device management system 330) based on the update information. After completion of the code update, network device 305 retrieves the data from network device 320. Thus, network device 305 temporarily stores a sufficient amount of data on network device 320 to perform the code update, and subsequently restores the data in response to completion of the code update. Network device 305 may identify and store data on a plurality of network devices 310 in substantially the same manner described above. Networks 315, 325 may employ any conventional or other protocols, standards, security measures, and/or error correction to transfer data.

Source network device 305 and target network devices 310 include a transfer agent 370 to perform operations for transferring and restoring the data. Transfer agent 370 may include an agent on source network device 305 and target network devices 310, or an operating system (OS) level extension to enable the functionality. In other words, transfer agent 370 may include an agent running in the OS of a corresponding device (e.g., in a container, etc.), or be built directly into the operating system of the corresponding device. The transfer agent dynamically and securely locates available storage and performs transfer and restore of data for a network device without operator involvement as described herein.

Figure 4:
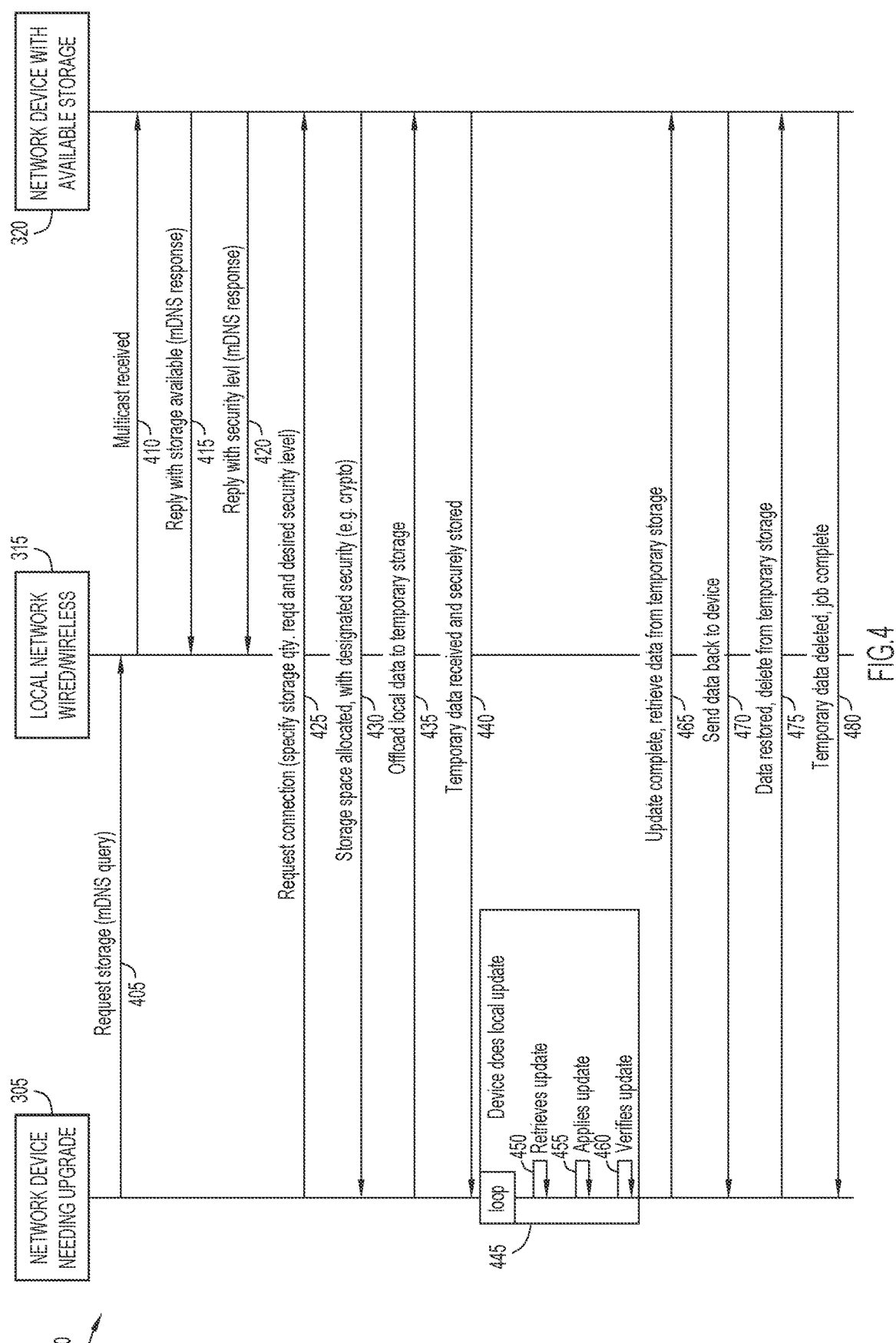
FIG. 4 is a flow diagram of a method for storage among network devices for a decentralized environment, according to an example embodiment.

With continued reference to FIG. 3, FIG. 4 illustrates a flow diagram of a method 400 for data storage among network devices for a decentralized environment, according to an example embodiment. Initially, network device 305 may desire to perform a task (e.g., update, upgrade, or otherwise change code (software or firmware); update, upgrade, or otherwise change device configuration; install patches, etc.). By way of example, the task may include a code (software or firmware) update or upgrade. Update information may be provided by device management system 330, where performance of the code update requires an amount of storage space on network device 305. In this case, network device 305 analyzes the update information and amount of available storage space and determines that the amount of storage space required by performance of the code update exceeds the amount of storage space available on network device 305.

Accordingly, network device 305 performs storage discovery to identify one or more target network devices to off-load sufficient amounts of data in order to provide available storage space to perform the code update. In the decentralized approach, the target network devices are peer network devices (as opposed to centralized storage devices in the centralized approach described above). Present embodiments may employ any conventional or other techniques to identify one or more target network devices (e.g., broadcast, link-local multicast, traditional multicast, etc.).

By way of example, network device 305 sends a request for storage space over network 315 at operation 405. For example, the request may include a Multicast Domain Name System (mDNS) query, where only those network devices that have multicast DNS process the query. Network 315 multicasts the request at operation 410 which is received by network devices 310. One or more network devices 310 determine that they have sufficient storage available to satisfy the request, and send a reply (e.g., mDNS response) including the amount of available storage at operation 415. The one or more network devices 310 send a further response (e.g., mDNS response, etc.) indicating a security level at operation 420.

In the event that multiple network devices 310 are available to network device 305 for storage, network device 305 may select a network device for storage based on various techniques (e.g., round robin technique alternating between network devices for each update, a best match based on available resources and/or other device characteristics, a lowest response time, etc.).

By way of example, network device 305 may identify a network device 320 (from among network devices 310) based on the responses. The decentralized approach enables network device 305 to utilize local network devices (or network 315). Network device 305 sends a connection request to network device 320 at operation 425. The connection request may specify the amount of storage and any required or desired level of security (e.g., encryption, etc.). Network device 305 may analyze the update information and amount of available storage space to determine a sufficient amount of storage for data to off-load. Network device 320 processes the request and returns a message at operation 430 indicating allocation of the requested storage space and a designated security level (e.g., encryption, etc.). Operations 425 and 430 basically enable the source network device 305 and target network device 320 to perform a negotiation for authentication and security for data and devices and verify compliance of security policies between source network device 305 and target network device 320. By way of example, network device 305 may authenticate network device 320 as a trusted device based on a certificate, and may verify network device 320 has sufficient available storage space to store the requested amount of data from network device 305. Further, parameters for secure transmission of data (e.g., personally identifiable information (PII) or other sensitive data, etc.) from network device 305 and for secure storage of data at network device 320 may be exchanged (e.g., encryption or other keys, etc.).

In addition, security policies of network device 305 and network device 320 may be compared to determine that network device 320 can store the data at a comparable level of security desired or required by network device 305 (e.g., a desired level of security for PI or other sensitive data, etc.). When network device 320 cannot be validated or provide an adequate level of security, network device 305 ends the session and does not use network device 320 to store data. In this case, network device 305 may identify and/or request connection with another network device 310 in substantially the same manner described above. In other words, network device 305 may select a target network device (from among a plurality of target network devices) based on satisfaction of authentication, storage, and/or security requirements.

In an embodiment, security may be omitted in cases of low or no security requirements. For example, the data to be off-loaded and stored may not be sensitive or require security.

Depending on the level of security, various identifiers may be used for the data in order to associate a network device with its temporarily stored data. For example, the identifiers may include certificates, or a combination of attributes (e.g., MAC address, host name, etc.) to establish a unique identifier. This may be device/implementation dependent and configurable based on the deployment.

Network device 305 determines data that can be removed from that network device and stored on network device 320 in order to provide sufficient storage space for the code update. Network device 305 includes knowledge of data that may be moved to temporarily free-up storage. For example, a router or switch may temporarily move previous compressed binary (BIN) files allowing enough storage space to unpack and process a code update. The data may be determined based on various criteria (e.g., priorities, essential data, user preferences, types of files, etc.).

The determined data is sent from network device 305 over network 115 to network device 320 for storage at operation 435. The data is processed according to a desired security policy for transmission and storage. Network device 320 stores the data (based on the identifier associated with network device 305), and sends a message to network device 305 at operation 440 indicating that the data has been received and securely stored.

Once the data is sent, network device 305 performs the code update from device management system 330 at operation 445. This includes retrieving code update information at operation 450, applying the code update at operation 455, and verifying the code update at operation 460. The code update may be accomplished via any conventional or other techniques.

After completion of the code update, network device 305 notifies network device 320 of completion of the code update, and requests retrieval of the data from network device 320 at operation 465. Network device 320 retrieves the data (based on the identifier associated with network device 305), and sends the data to network device 305 at operation 470. Network device 305 restores the data on that network device, and notifies network device 320 of the restoration of the data. Further, network device 305 sends a request to network device 320 to delete the data temporarily stored on network device 320 at operation 475.

Network device 320 deletes the data and informs network device 305 of the deletion and job completion at operation 480. Thus, network device 305 temporarily stores a sufficient amount of data on network device 320 to perform the code update, and subsequently restores the data in response to completion of the update.

An embodiment may provide a cross-over between the centralized and decentralized approaches (e.g., the centralized and decentralized approaches may not be mutually exclusive). Referring back to FIG. 3, the decentralized approach may be extended by use of a forwarding agent 380 on a network device within network 315. The forwarding agent expands the decentralized system into a more centralized system, similar to using a multi-segment gateway with a local system. For example, forwarding agent 380 may send a request from network device 305 over network 325 to a server system 390 that maintains location information for various centralized or designated storage devices. Server system 390 identifies a location of a storage device satisfying the request, and sends a response to network device 305 including a location (or address) of a storage device in substantially the same manner described above. This enables temporary storage of data from network device 305 on one or more storage devices (of the centralized and/or decentralized approaches) in order for network device 305 to perform the code update and restore the data in substantially the same manner described above. Server system 390 may be implemented by, or include, any conventional or other network elements (e.g., routers, gateways, servers, etc.).

FIG. 5 is a flowchart of an example method 500 for data storage among network devices. At operation 505, a first network device is determined to have insufficient storage to perform a task. At operation 510, a second network device is identified with available storage. At operation 515, data is transferred from the first network device to the second network device to provide sufficient storage for the task on the first network device. At operation 520, the task is performed on the first network device. At operation 525, the data is restored to the first network device from the second network device after completion of the task.

In embodiments for the centralized and decentralized approaches, security and integrity functions (e.g., security, redundancy, data integrity, etc.) may be communicated between source network devices and target (or storage) devices using messaging appropriate for the particular discovery technique employed. These functions are typically more easily defined, implemented, and controlled using the centralized approach (rather than the decentralized approach), thereby enabling the centralized approach to be more applicable for enterprises and larger scale use. However, the decentralized approach provides a simpler plug-and-play capability for use in smaller environments (e.g., a home, etc.).

In embodiments, the storage discovery is not secured since storage locations are to be freely discoverable as a service on the network (e.g., similar to other discoverable network services, such as a network attached storage (NAS)). However, the data is secured in transit and while stored.

In certain situations and closed environments, an embodiment may hard-code a storage device indicator (e.g., IP or other address, etc.) in a network device (e.g., the device for storage is predetermined for the network device). This may be limited due to the fixed nature of the IP addresses involved and is used for specific applications (e.g., Internet of Things (IoT) devices that lack the ability to implement a Domain Name System (DNS) stack, a closed system where access to DNS may be unavailable, etc.).

In an embodiment, the device storing data may retain data for the time it takes to perform a code update (or other task) and transfer the data and, upon an acknowledgement, can remove the data. In order for a network device to act as a remote storage device, it may need to meet a number of requirements, including being stationary and reliably available. In the case of a source device failure or absenteeism, the off-loaded data may be stored until administrator intervention, or be automatically removed after a configurable timeout period. Data is encrypted in flight between the source and destination, and also encrypted at rest while it is stored. Devices that have critical data may rely on their native backup techniques in case of an unavailable device for storage, such as local, cloud, or any other backup techniques. Redundancy may be included, but would be implementation dependent. For example, in an embodiment with the centralized approach, multiple storage servers may be used and replication may be implemented to simultaneously back-up multiple instances (e.g., via anycast, etc.). A similar approach may be used in an embodiment for the decentralized approach.

In an embodiment, common failure scenarios may be handled. For example, when a network device performing an update (or other task) gracefully fails, the network device may retrieve its data, continue operating, and show a failed update. Depending on the device, it may be responsible for notifying an administrator (e.g., via syslog, a platform, etc.). By way of further example, when a failure is more catastrophic, the device for storage may hold onto a data package until an administrator intervened. Upon a successful upgrade (or other task), the network device may establish its session with the device for storage, retrieve its data package, validate the data package, and acknowledge the data package. At this point, the data package can be removed from the device for storage.

In addition, centralized/dedicated storage devices may notify administration that they are low on storage (e.g., via syslog, Simple Network management Protocol (SNMP), web hooks, email, Short Message Service (SMS), etc.). For example, when a network device establishes a connection with another network device, the network devices validate how much storage is required. When there is insufficient storage, the session ends and the network device can attempt to find a different device for storage or notify of a failed upgrade (or other task). When a network device performs discovery for a device for storage (without being hard-coded with a device for storage), the device for storage may not respond unless it had available storage.

An embodiment enables source and target (or storage) network devices to dynamically establish a session, perform a data off-load from the source to target (or storage) network device, perform an upgrade (or other task) on the source network device, and restore the off-loaded data to the source network device from the target network device. The target network device storing the data may be a physical or virtual appliance, or the technique may be incorporated into other products. The technique may be distributed, where all access switches may act as a local storage (e.g., for cameras or other IoT devices, etc.). For example, the technique may be built into a platform and leveraged by switches. In this example, the switch notifies the platform that it involves a certain amount of storage, and the platform is responsible for either accepting or denying the request, and reserving the storage. Further, the technique may be leveraged on a less intelligent platform. By way of example, a small computing device may be used to back-up historical data on a number of IoT sensors. The embodiment defines how to locate a distributed or centralized storage, negotiate the terms of security, and perform the back-up.

An embodiment may maintain information about location of the data with respect to a reboot or other loss of connectivity. This may be part of the device upgrade (or other task) workflow. Further, intelligent devices may maintain an upgrade state and leverage that information to know that a data restore is required and where the data is located. A less intelligent device may be configured to reach out after every upgrade or reboot, and inquire for the presence of data to restore based on an associated identifier.

Figure 6:
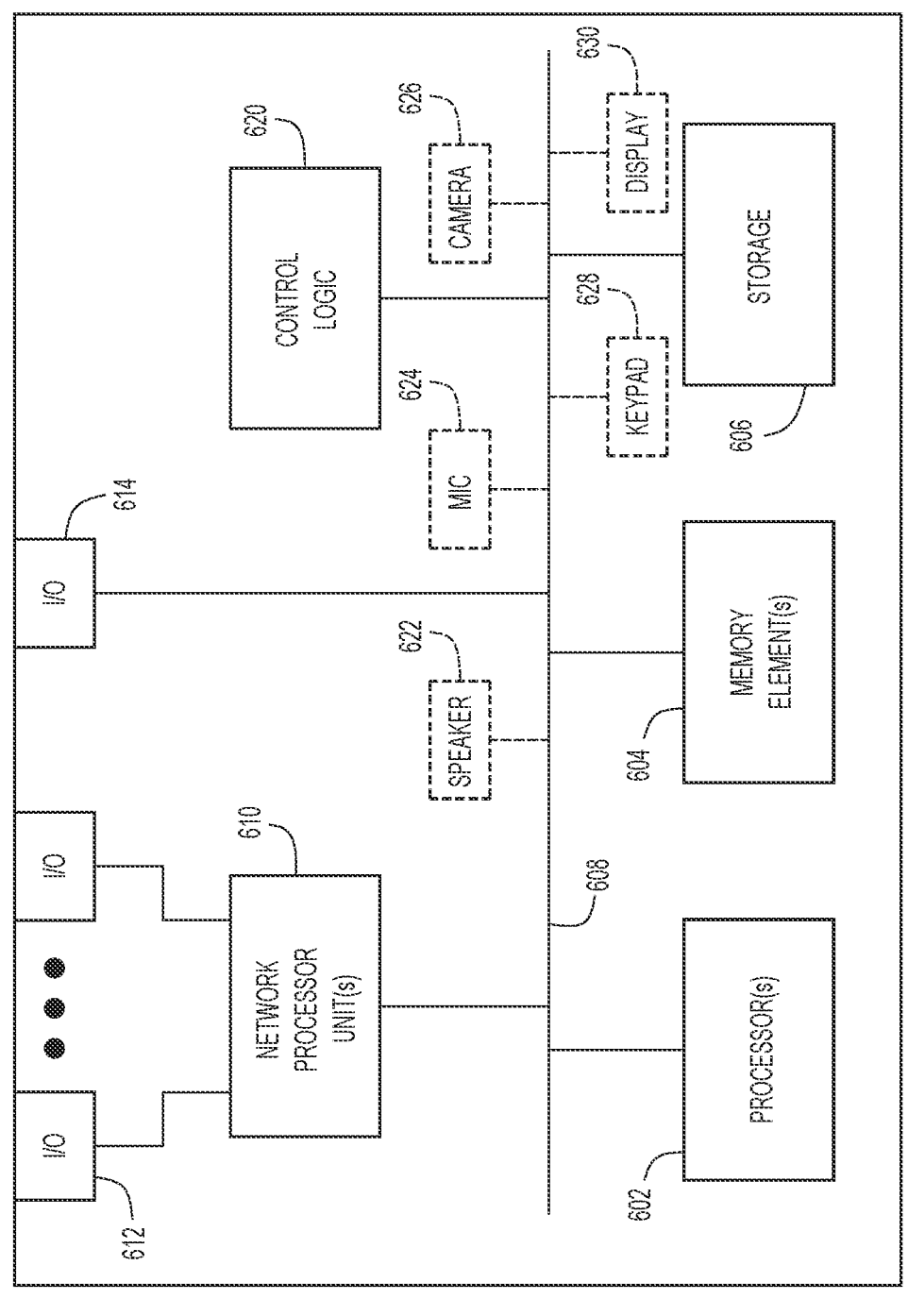
FIG. 6 illustrates a hardware block diagram of a computing device configured to perform functions associated with data storage among network devices as discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any device entity/entities (e.g., computer devices, network computing device (e.g., router, network node, etc.), user device, source network device, target network device, storage device, etc.) as discussed for the techniques depicted in connection with FIGS. 1-5 in order to perform operations of the various techniques discussed herein.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, network computing device, user device, etc.), computing device 600 may further include, or be coupled to, an audio speaker 622 to convey sound, microphone or other sound sensing device 624, camera or other image capture device 626, a keypad or keyboard 628 to enter information (e.g., alphanumeric information, etc.), and/or a touch screen or other display 630. These items may be coupled to bus 608 or I/O interface(s) 614 to transfer data with other elements of computing device 600.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, network devices, storage devices, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, network devices, storage devices, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: determining that a first network device has insufficient storage to perform a task; identifying a second network device with available storage; transferring data from the first network device to the second network device to provide sufficient storage for the task on the first network device; performing the task on the first network device; and restoring the data to the first network device from the second network device after completion of the task.

In one example, the task includes an update to code of the first network device.

In one example, the method further comprises sending messages, via the first network device, indicating resources of the first network device.

In one example, the method further comprises: determining compliance of security policies of the first and second network devices; and negotiating security parameters for transferring the data from the first network device to the second network device.

In one example, identifying the second network device comprises identifying a centralized network device to receive the data, wherein the centralized network device includes one of a router and a centralized server.

In one example, identifying the second network device comprises identifying the second network device within a network of decentralized network devices.

In one example, identifying the second network device further comprises identifying the second network device based on messages transmitted by the decentralized network devices indicating available resources.

In another form, an apparatus is provided. The apparatus comprises: a first network device comprising one or more processors configured to: determine that the first network device has insufficient storage to perform a task; identify a second network device with available storage; transfer data from the first network device to the second network device to provide sufficient storage for the task on the first network device; perform the task; and restore the data from the second network device after completion of the task.

In another form, one or more non-transitory computer readable storage media are provided. The non-transitory computer readable storage media are encoded with processing instructions that, when executed by one or more processors of a first network device, cause the one or more processors to: determine that the first network device has insufficient storage to perform a task; identify a second network device with available storage; transfer data from the first network device to the second network device to provide sufficient storage for the task on the first network device; perform the task; and restore the data from the second network device after completion of the task.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

determining an amount of storage space required to perform a task on a first network device of a network;

determining that the amount of storage space required to perform the task exceeds an amount of storage space available on the first network device;

identifying a second network device of the network from among a plurality of second network devices with available storage and remote from the first network device based on a round-robin technique alternating between the plurality of second network devices for each task;

comparing security policies of the first network device indicating encryption used for storing sensitive data on the first network device to security policies of the second network device indicating encryption used for storing sensitive data on the second network device;

determining that the second network device has a level of security for storage of the sensitive data of the first network device that is required by the first network device;

off-loading data stored on the first network device to the second network device to provide an amount of available storage space on the first network device to perform the task;

performing the task on the first network device; and restoring data off-loaded to the second network device on the first network device after completion of the task.

2. The method of claim 1, wherein the task includes an update to code of the first network device.

3. The method of claim 1, further comprising:

sending messages, via the first network device, indicating resources of the first network device.

4. The method of claim 1, further comprising:

negotiating security parameters for off-loading the data from the first network device to the second network device.

5. The method of claim 1, wherein identifying the second network device comprises:

identifying a centralized network device to receive the data, wherein the centralized network device includes one of a router and a centralized server.

6. The method of claim 1, wherein identifying the second network device comprises:

identifying the second network device within a network of decentralized network devices.

7. The method of claim 6, wherein identifying the second network device further comprises:

identifying the second network device based on messages transmitted by the decentralized network devices indicating available resources.

8. An apparatus comprising:

a first network device of a network comprising one or more processors configured to perform operations comprising:

determining an amount of storage space required to perform a task on the first network device;

determining that the amount of storage space required to perform the task exceeds an amount of storage space available on the first network device;

identifying a second network device of the network from among a plurality of second network devices with available storage and remote from the first network device based on a round-robin technique alternating between the plurality of second network devices for each task;

comparing security policies of the first network device indicating encryption used for storing sensitive data on the first network device to security policies of the second network device indicating encryption used for storing sensitive data on the second network device;

determining that the second network device has a level of security for storage of the sensitive data of the first network device that is required by the first network device;

off-loading data stored on the first network device to the second network device to provide an amount of available storage space on the first network device to perform the task;

performing the task; and restoring data off-loaded to the second network device on the first network device after completion of the task.

9. The apparatus of claim 8, wherein the task includes an update to code of the first network device.

10. The apparatus of claim 8, wherein the one or more processors are configured to perform further operations including:

negotiating security parameters for off-loading the data from the first network device to the second network device.

11. The apparatus of claim 8, wherein identifying the second network device comprises:

identifying a centralized network device to receive the data, wherein the centralized network device includes one of a router and a centralized server.

12. The apparatus of claim 8, wherein identifying the second network device comprises:

identifying the second network device within a network of decentralized network devices.

13. The apparatus of claim 12, wherein identifying the second network device further comprises:

identifying the second network device based on messages transmitted by the decentralized network devices indicating available resources.

14. One or more non-transitory computer readable storage media encoded with processing instructions that, when executed by one or more processors of a first network device of a network, cause the one or more processors to perform operations comprising:

determining an amount of storage space required to perform a task on the first network device;

determining that the amount of storage space required to perform the task exceeds an amount of storage space available on the first network device;

identifying a second network device of the network from among a plurality of second network devices with available storage and remote from the first network device based on a round-robin technique alternating between the plurality of second network devices for each task;

comparing security policies of the first network device indicating encryption used for storing sensitive data on the first network device to security policies of the second network device indicating encryption used for storing sensitive data on the second network device;

determining that the second network device has a level of security for storage of the sensitive data of the first network device that is required by the first network device;

off-loading data stored on the first network device to the second network device to provide an amount of available storage space on the first network device to perform the task;

performing the task; and restoring data off-loaded to the second network device on the first network device after completion of the task.

15. The one or more non-transitory computer readable storage media of claim 14, wherein the task includes an update to code of the first network device.

16. The one or more non-transitory computer readable storage media of claim 14, wherein the processing instructions cause the one or more processors to perform further operations including:

sending messages indicating resources of the first network device.

17. The one or more non-transitory computer readable storage media of claim 14, wherein the processing instructions cause the one or more processors to perform further operations including:

negotiating security parameters for off-loading the data from the first network device to the second network device.

18. The one or more non-transitory computer readable storage media of claim 14, wherein identifying the second network device comprises:

identifying a centralized network device to receive the data, wherein the centralized network device includes one of a router and a centralized server.

19. The one or more non-transitory computer readable storage media of claim 14, wherein identifying the second network device comprises:

identifying the second network device within a network of decentralized network devices.

20. The one or more non-transitory computer readable storage media of claim 19, wherein identifying the second network device further comprises:

identifying the second network device based on messages transmitted by the decentralized network devices indicating available resources.

* * * * *